(12) United States Patent
Huber

(10) Patent No.: US 7,913,950 B2
(45) Date of Patent: Mar. 29, 2011

(54) AIRCRAFT WITH PALLETIZED FUNCTIONAL UNITS

(75) Inventor: Thomas Huber, Schliersee (DE)

(73) Assignee: Telair International GmbH (DE)

( * ) Notice: Subject to any disclaimer, the term of this patent is extended or adjusted under 35 U.S.C. 154(b) by 398 days.

(21) Appl. No.: 10/565,080

(22) PCT Filed: Jul. 15, 2004

(86) PCT No.: PCT/EP2004/007921
§ 371 (c)(1),
(2), (4) Date: Oct. 2, 2006

(87) PCT Pub. No.: WO2005/012084
PCT Pub. Date: Feb. 10, 2005

(65) Prior Publication Data
US 2007/0181745 A1  Aug. 9, 2007

(30) Foreign Application Priority Data

Jul. 18, 2003 (DE) .................. 103 32 798
Aug. 27, 2003 (DE) .................. 103 39 507
Aug. 27, 2003 (DE) .................. 103 39 508
Mar. 8, 2004 (DE) ............. 10 2004 011 163
Mar. 8, 2004 (DE) ............. 10 2004 011 164

(51) Int. Cl.
*B64D 9/00* (2006.01)
*B64C 1/20* (2006.01)

(52) U.S. Cl. .................. 244/118.1; 244/137.1

(58) Field of Classification Search ............. 244/118.1, 244/118.2, 117 R, 119, 137.1, 118.6, 120, 244/173.1, 129.2, 135 B, 136; 137/899.2; 4/670; 169/53
See application file for complete search history.

(56) References Cited

U.S. PATENT DOCUMENTS

| | | | | |
|---|---|---|---|---|
| 3,381,921 A | * | 5/1968 | McDonough et. al. | 410/79 |
| 3,753,541 A | * | 8/1973 | Grueber et al. | 244/137.1 |
| 3,912,206 A | * | 10/1975 | Jong | 244/118.1 |
| 4,780,043 A | * | 10/1988 | Fenner et al. | 244/137.1 |
| 4,929,133 A | | 5/1990 | Wiseman | |
| 5,083,727 A | * | 1/1992 | Pompei et al. | 244/118.6 |
| 5,090,639 A | * | 2/1992 | Miller et al. | 244/118.1 |
| 5,784,836 A | * | 7/1998 | Ehrick | 244/118.5 |
| 5,927,650 A | * | 7/1999 | Huber | 244/118.1 |
| 5,992,108 A | * | 11/1999 | Falcey | 52/220.2 |
| 6,101,766 A | * | 8/2000 | Mogensen | 244/118.6 |
| 6,659,402 B1 | * | 12/2003 | Prochaska | 244/118.6 |

FOREIGN PATENT DOCUMENTS

| | | |
|---|---|---|
| DE | A 1 198 680 | 5/1961 |
| DE | 2 162 042 | 7/1972 |
| DE | 41 16 524 A1 | 5/1991 |
| DE | 42 08 438 A1 | 3/1992 |
| DE | 44 16 506 A1 | 5/1994 |
| EP | 0 035 955 A2 | 2/1981 |
| GB | 2 326 863 A | 1/1999 |

* cited by examiner

*Primary Examiner* — Tien Dinh
*Assistant Examiner* — Richard R Green
(74) *Attorney, Agent, or Firm* — Baker & Hostetler LLP

(57) ABSTRACT

An aircraft comprises a cargo compartment having a cargo-compartment floor, and at least one functional unit, such as a water tank, a waste-water tank, or an electrical equipment rack. The functional unit is disposed on a pallet so that the functional unit can be transported into, and installed in, the cargo compartment. A fixation device attaches the pallet to the cargo-compartment floor.

17 Claims, 4 Drawing Sheets

AIRCRAFT WITH PALLETIZED FUNCTIONAL UNITS

CROSS-REFERENCE TO RELATED APPLICATIONS

This application claims priority to Patent Cooperation Treaty (PCT) Application No. PCT/EP2004/007921 filed Jul. 15, 2004, entitled, which claims priority to German Patent Application Serial No. 10332798.3 filed Jul. 18, 2003; which claims priority to German Patent Application Serial No. 10339507.5 filed Aug. 27, 2003; which claims priority to German Patent Application Serial No. 10339508.3 filed Aug. 27, 2003; which claims priority to German Patent Application Serial No. 102004011163.4 filed Mar. 8, 2004; which claims priority to German Patent Application Serial No. 102004011164.2 filed Mar. 8, 2004, all of the disclosure of which is hereby incorporated by reference in its entirety.

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to an aircraft as well as to a method of manufacturing an aircraft.

BACKGROUND OF THE INVENTION

Aircraft are customarily equipped with a cargo compartment, the floor of which is supported against the body and/or a skin of the aircraft by way of supporting elements, in particular floor beams. The cargo compartment is not only used to store freight, such as the passengers' luggage; in addition, various functional units such as water tanks, waste-water tanks, and electronic equipment racks (hereinafter "EE racks") and similar electronic components, are fixed in position there. The processes of installing these functional components and exchanging them involves considerable effort.

BRIEF SUMMARY OF THE INVENTION

It is an object of the invention to provide an aircraft and a method for the manufacture thereof to simplify the installation and removal of functional units.

This object is achieved by the provision of an aircraft that incorporates a cargo compartment with a floor and supporting elements, in particular floor beams to support the cargo-compartment floor and connect it to a body or skin of the aircraft, as well as functional units, in particular water tanks, waste-water tanks, EE racks or similar electronic components, wherein the functional units are arranged on pallets or similar support structures by means of which to transport the functional units into the cargo compartment, and these pallets are provided with fixation devices to create a firm connection to the cargo-compartment floor.

Hence it is a basis of the invention that the functional units, which are normally regarded as permanently installed parts of an aircraft, are now considered transportable units that can be moved into and out of the cargo compartment as needed. This completely new way of treating the functional units not only offers major advantages for the construction of an aircraft but also greatly facilitates the maintenance work to be done on the aircraft. In particular, an individual functional unit can be serviced, modified or repaired on its own outside the aircraft, and hence in surroundings where the work can be done considerably more comfortably than in the confines of an aircraft cargo compartment. In addition, the techniques used to work on the functional units can be different from those normally employed inside the (cramped) cargo compartment, i.e. at the place where the functional units are installed.

Preferably the pallets and/or the functional units and/or the cargo-compartment floor comprise junction devices by means of which connection leads or similar functional devices in the functional units can be joined to corresponding connection leads in the aircraft. When the functional unit is a water tank, such junction devices are sleeves and pieces of tubing through which the necessary connection is made to the aircraft's conduits for water and waste water. In the case of EE racks, they are more complicated structures within the aircraft cabling.

The cargo compartment is preferably equipped with guide devices to guide the functional units while they are transported into and within the cargo compartment. Such guide devices can be the guides on the cargo-compartment floor that are also used for freight pallets. However, separate guide devices can also be provided in order to guide the functional units to particular places, at least in the sections where they are to be finally installed.

The guide devices can also comprise guide rails along side walls and/or on the ceiling of the cargo compartment, which is reasonable in particular when the functional units extend over the entire height and/or width of the cargo compartment. This is the case especially when the pallets comprise at least sections of partitions that are or can be mounted on them. To regard such partitions as a component of the functional units is likewise an essential idea, which is novel in itself. When partitions (or sections thereof) are mounted on pallets, it is especially easy to move them from place to place, in order to create subdivisions of the cargo compartment for particular uses, or to enlarge existing subdivisions or reduce their size.

Now functional units can be mounted on sections of (or entire) partitions, as has in principle also previously been customary for the installation of certain functional units. In the present case, however, the partitions together with the functional units on their pallet constitute components in themselves, the assembly of which is facilitated by occurring outside the aircraft, after which they can be transported into the cargo compartment and fixed in position there by simple means. The partitions in this case preferably comprise sealing devices to make the junction with the cargo compartment leakproof, so that there is no difficulty in filling the cargo compartment with an extinguisher gas in case of fire.

In one embodiment of the invention the cargo-compartment floor comprises floor elements connected to the supporting elements to form prefabricated floor modules. This measure makes it possible to assemble the cargo-compartment floor outside the aircraft, including the associated supporting elements, which likewise provides the advantages mentioned above. In this case preferably sections of cable channels, hydraulic conduits, water conduits, electrical leads or similar conducting devices are provided in the floor modules in such a way that, together with conducting devices of the same kind in adjacent floor modules, they form overall conduction systems when the floor modules have been installed in the aircraft. In this way the floor modules simultaneously constitute sections of the conducting devices, branches of which are provided if desired for connection to prespecified sites on the floor elements and/or the functional units. As a result, the construction of conducting systems within the aircraft is made considerably easier. Altogether, then, the floor modules in this embodiment of the invention should contain not only the complete cabling and drainage etc. for the organs of the cargo-loading system, but should preferably also comprise the complete ducting for the entire aircraft, e.g. the air-conditioner ducts or other cables that are normally only passed through this region of the aircraft. As a result, a considerably more efficient operation during construction of the aircraft as a whole is achieved.

Preferably assembly elements are provided on the floor elements to produce a mechanically stable connection of adjacent floor elements to one another, during or after installation in the aircraft. It is thus possible to connect the floor elements so that they form a rigid, stable and stiff surface, which endows the whole aircraft with increased stability and considerably strengthens the cargo-compartment floor.

The floor elements, like the partitions, preferably comprise sealing devices to seal off a space above the floor elements from a space below the floor elements. This sealing is intended to prevent leakage on one hand of liquids such as water that is carried into the cargo compartment as containers are loaded, and on the other hand of gases such as are used to extinguish fires, so that the cargo compartment can be filled with an inert gas to put a fire out. These sealing devices are particularly simple to apply (e.g., in the form of a sprayed-on layer), because the floor modules are assembled outside the cargo compartment and hence are accessible from below.

Preferably leakproof connecting elements are provided to seal the junctions between adjacent floor elements and/or between a floor element and the skin of the aircraft. These sealing elements are in particular constructed so that after installation of a floor module, the floor element of this module is sealed to the adjacent floor element as well as to the cargo compartment, and a separate, subsequent sealing procedure can be eliminated.

Preferably drainage devices are provided to carry liquid out of the cargo compartment and transfer the liquid into corresponding drainage devices in adjacent floor modules, so that there is no need to install conduits for the removal of water as a separate operation.

The floor modules are additionally provided with insulation devices to insulate a lower half of the fuselage. As a result, it is not necessary to apply the insulation after installation; instead, it can be applied to the modules while they are outside the aircraft. The insulation devices can either be situated below the floor elements, which in particular is very simply accomplished outside the aircraft, or alternatively (where appropriate, additionally) can be disposed in the region of the supporting elements, near the aircraft skin, if desired. Hence there is no need to work in the restricted region of the aircraft that is underneath the cargo-compartment floor.

The floor modules also comprise bulkheads or similar partitions, or else fixation devices for the attachment of partitions, such as are customarily installed subsequently in certain sections of the cargo compartment (as explained above). The partitions can thus either already be attached to the floor modules or be attached to pallets and then pushed into the cargo compartment. The partitions preferably consist at least in part of ballistically resistive material, so as to ensure a high degree of reliability. The floor modules can additionally comprise wall linings and/or ceiling linings or similar lining elements, or devices with which to install them, so as to line the surface of the cargo compartment. This likewise makes possible a simplified construction of an aircraft.

The above-mentioned objective is achieved with regard to the method, for an aircraft comprising a cargo compartment with a cargo-compartment floor, supporting elements, in particular floor beams to support the cargo-compartment floor and to connect it to a body or a skin of the aircraft, and functional units, in particular water tanks, waste-water tanks, EE racks or similar electronic components, in that the functional units are mounted outside the aircraft on pallets or similar supporting structures, after which the mounted functional units are loaded into the aircraft and transported on the cargo-compartment floor to a specified site in the cargo compartment, where the mounted functional units are attached to the cargo-compartment floor. The advantages already explained above are evident in this method.

Preferably at least sections of partitions are mounted on the pallets or the functional units while outside the aircraft, so that the work of installation is further facilitated.

Preferred embodiments of the invention will now be described with reference to the accompanying drawings.

DETAILED DESCRIPTION OF THE INVENTION

Figure 1:
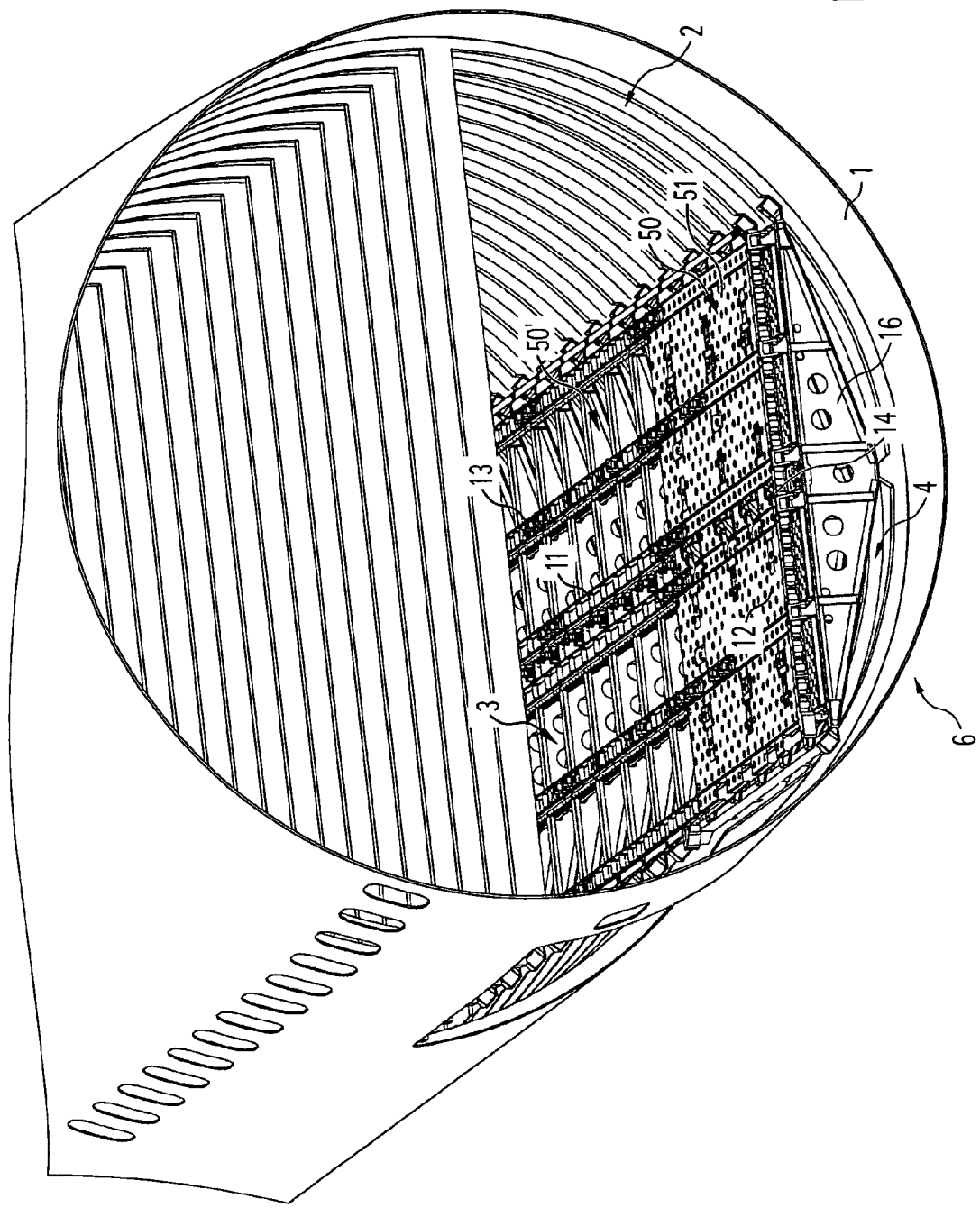
FIG. 1 is a perspective view drawing of part of an aircraft fuselage with a cargo-compartment floor shown mostly installed therein.

In the following description, the same reference numerals are used for identical parts or parts with identical actions.

As shown in FIG. 1, a body or an (outer) skin 1 of an aircraft encloses within the lower half 6 of the fuselage a cargo compartment 2, in which floor elements 51 form a cargo-compartment floor 3 below which is a bilge space 4. The floor elements 51 are fixed to supporting elements, so-called floor beams 16, which in turn are fixed to the skin 1 of the aircraft.

On or at the floor elements 51 are attached surfaces on which to walk, so-called floor panels 52 (see FIG. 4), as well as the customary elements for transporting and securing freight, namely roller elements 11, ball elements 12, latches 13 and powered roller-drive units, so-called PDUs 14, such as are generally provided.

Figure 2:
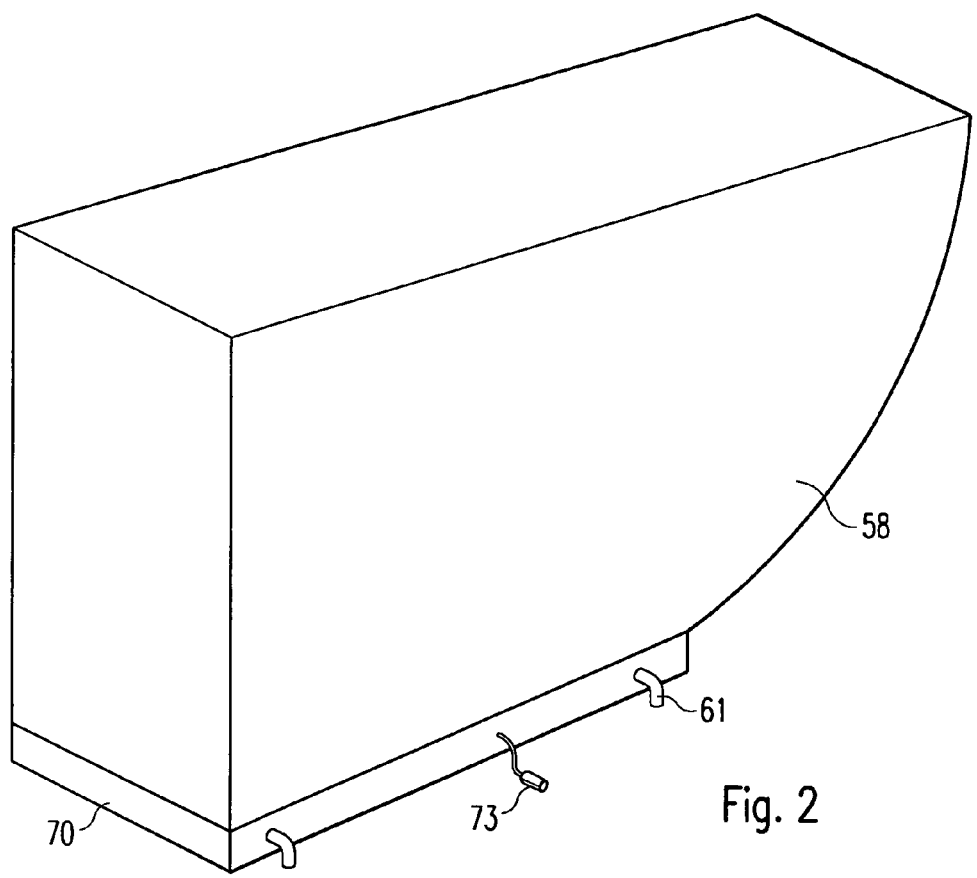
FIG. 2 shows an example of a functional unit, in this case a tank.
Figure 3:
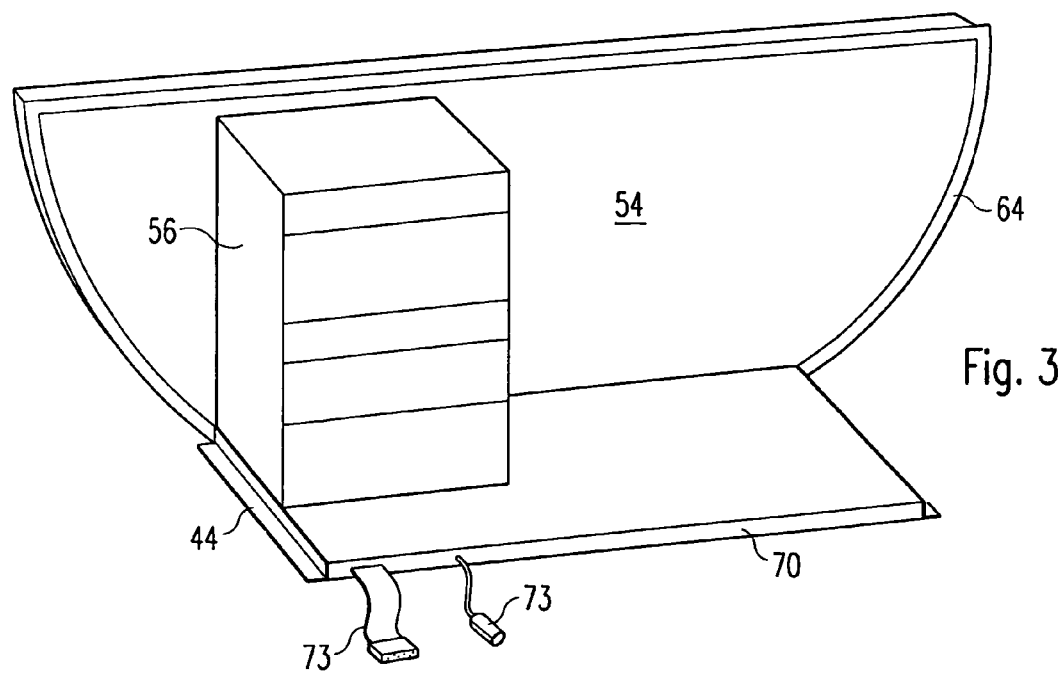
FIG. 3 shows another example of a functional unit, here an EE rack to which a partition has been attached.

So that functional units can be installed in the cargo compartment 3, e.g. a water tank 58 as shown in FIG. 2 or an EE rack 56 in FIG. 3, these functional units, i.e. the water tank 58 or the EE rack 56, are mounted on a carrier structure 70, e.g. a pallet. The functional elements are further provided with the appropriate connectors—for instance, in the case of the tank according to FIG. 2 with a pipe connector 61 and an electrical connection lead 73 (for controlling valves) or, in the case of the EE rack according to FIG. 3, with the same kind of electrical connection leads 73.

In the embodiment shown in FIG. 3 the EE rack 56 is not the only thing mounted on the pallet 70; instead, a partition 54 with sealing devices 64 is also mounted there to enable the EE rack to be attached to the partition 54 while outside the aircraft.

Figure 5:
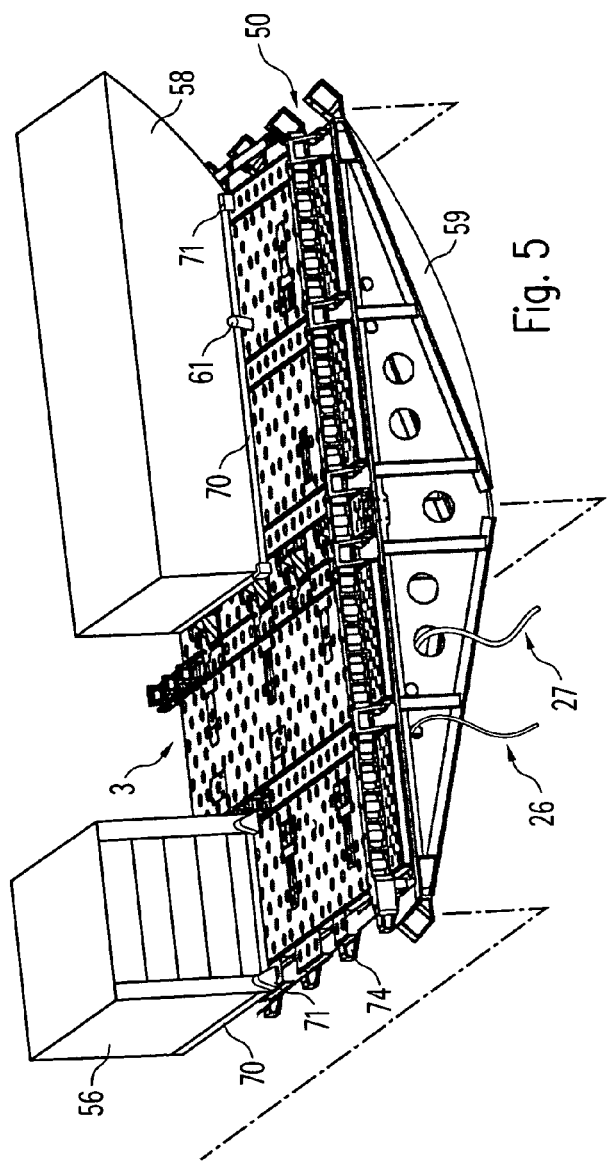
FIG. 5 is a perspective drawing of a floor module on which functional units have been mounted by way of pallets.
Figure 6:
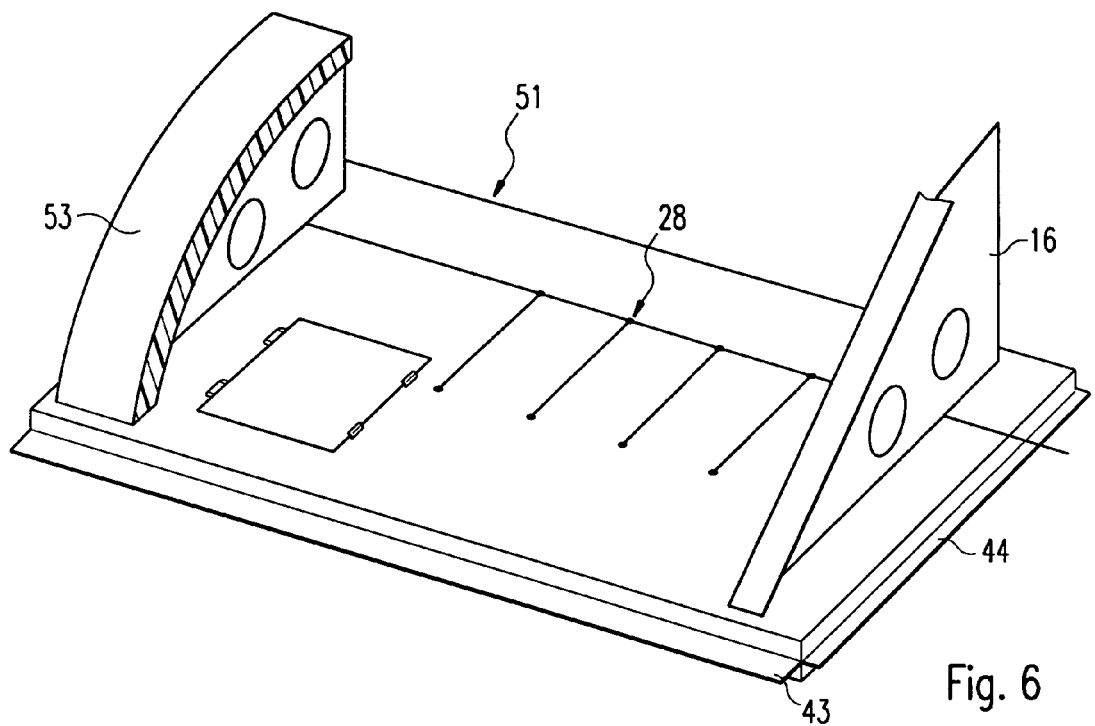
FIG. 6 is a partial section of a floor module, viewed from below.
Figure 7:
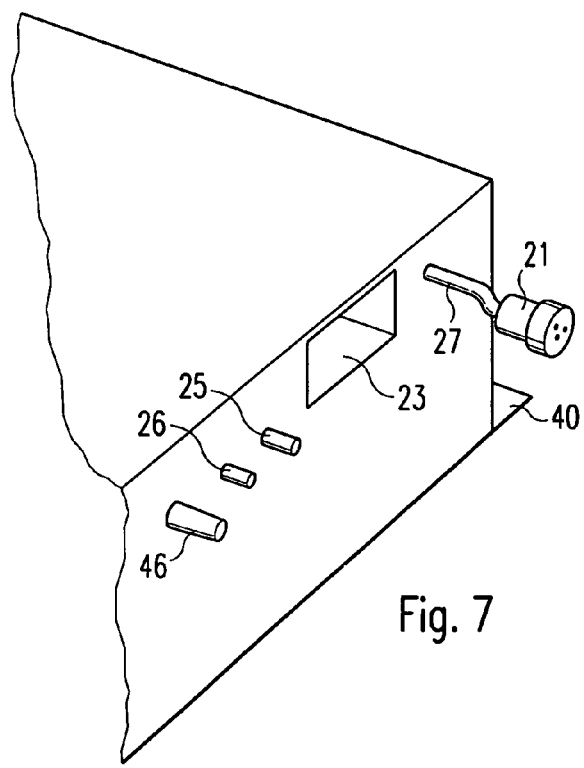
FIG. 7 is a partial section of a floor module with connecting leads and transmission sockets.

When the functional elements 56, 58 on their supporting structures, the pallets 70, are transported into the cargo compartment 3, the equipment intended for freight (containers, pallets etc.) is used for this purpose, namely the roller elements 11, ball elements 12 and PDUs 14. Then, once the functional units have reached their destination in the cargo compartment, they are fixed in position either by the latches 13 also provided for freight or else by means of separate fixation devices 71, such as are shown in FIG. 5. After fixation to the cargo-compartment floor 3, the pipe connectors 61 and/or connection leads 73 are connected to corresponding connectors and connection leads on the cargo-compartment floor or below the floor (by way of appropriate access openings). In the case of a floor made up of modules, transmission sockets 21 are provided on electrical leads 27, cable channels 23, hydraulic conduits 25, water conduits 26 and the relevant branches 28, so that such electrical, hydraulic or other connections to the corresponding functional units can be created and also, advantageously, to incorporate the entire ducting associated with the aircraft. Such connection leads etc. are shown in particular in FIGS. 6 and 7. In addition an insulator 53 is indicated in FIG. 6, by means of which the cargo compartment 3 and/or the bilge space 4 can be thermally insulated from the lower half 6 of the fuselage. FIGS. 6 and 7 also show sealing devices 40 and leakproof connecting elements 43 and 44, which serve to seal the cargo-compartment floor against the skin 1.

To drain water away from the cargo-compartment floor appropriate apertures are provided, which open into drainage conduits 46.

Figure 4:
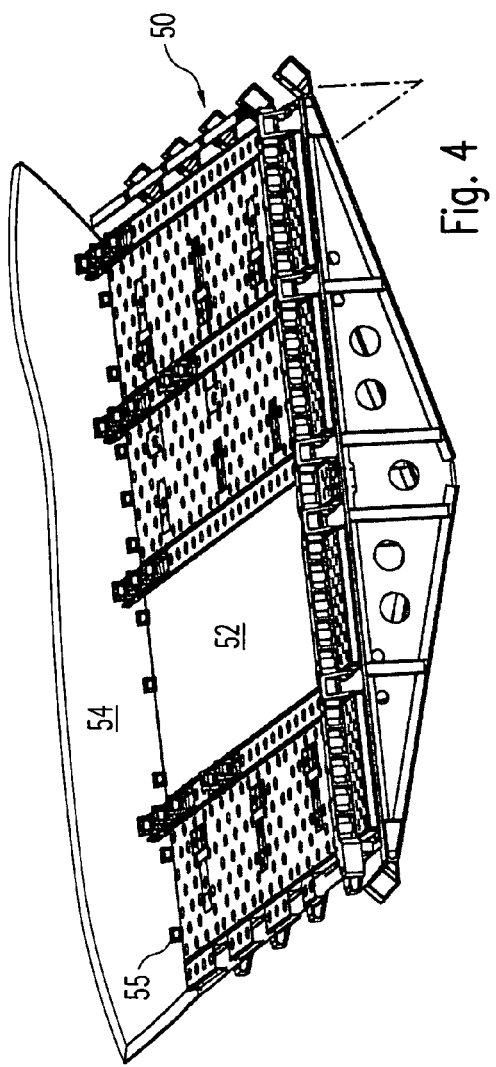
FIG. 4 is a perspective drawing of a floor module.

The partitions 54 can—as shown in FIG. 4—be mounted not only directly on the pallets 70 as in the embodiment according to FIG. 3, but instead be fixed to the cargo-compartment floor 3 by way of separate mounting devices 55.

Furthermore, the installation of the functional units in the cargo compartment 3 is facilitated by guide devices 74 on the cargo-compartment floor (see FIG. 5), which serve to guide the functional units on their pallets 70 to precisely the place where they are later to be installed, and at which the corresponding connection devices (for signal leads, water conduits etc.) are provided.

LIST OF REFERENCE NUMERALS

1 Body/skin
2 Cargo compartment
3 Cargo-compartment floor
4 Bilge space
6 Lower half of fuselage
11 Roller element
12 Ball element
13 Latches
14 PDU
16 Floor beam
21 Transmission socket
23 Cable channel
25 Hydraulic conduit
26 Water conduit
27 Electrical lead
28 Branch
30 Assembly elements
40 Sealing device
43 Leakproof connecting element
44 Leakproof connecting element
46 Drain
50,50' Floor module
51, 51' Floor element
52 Surface for walking
53 Insulator
54 Partition
55 Fixation device for partition
56 EE rack
58 Water tank
61 Water connector
64 Sealing device
70 Pallet
71 Fixation device
72 Electrical connector
73 Connection lead
74 Guide device

The invention claimed is:

1. An aircraft, comprising:
a cargo compartment having a cargo compartment floor;
at least one functional unit selected from the group consisting of a water tank and a waste-water tank; and
a pallet supporting said functional unit, said pallet being adapted for the transportation of said functional unit into said cargo compartment and being provided with a fixation means that provides a stable connection to said cargo-compartment floor, such that the pallet lays on the cargo-compartment floor between the cargo-compartment floor and the functional unit;
wherein said at least one functional unit comprises at least one pipe connector, and
wherein said at least one pipe connector is connected to a corresponding pipe connector provided on or below said cargo compartment floor.

2. The aircraft according to claim 1, wherein said cargo compartment comprises guide means adapted to guide said functional unit as it is being transported within the cargo compartment.

3. The aircraft according to claim 1, wherein at least one section of a partition is mounted on said pallet.

4. The aircraft according to claim 3, wherein said functional unit is mounted on said at least one section of a partition.

5. The aircraft according to claim 3, wherein said partition comprises sealing means whereby it is sealed to parts of the aircraft defining said cargo compartment.

6. The aircraft according to claim 1, wherein said cargo-compartment floor comprises floor elements that are connected to supporting beams to form prefabricated floor modules.

7. The aircraft according to claim 6, wherein sections of conducting devices comprising at least one of cable channels, hydraulic conduits, water conduits, an air-conditioner duct and electrical leads are provided in the floor modules in such a way that those in one floor module connect with others of the same kind in adjacent floor modules to form overall conducting systems on installation in the aircraft.

8. The aircraft according to claim 7, wherein at least one of said conducting devices comprises a branch adapted for connection to a prespecified place on at least one of said floor elements and said functional unit.

9. The aircraft according to claim 6, wherein said cargo-compartment floor comprises a plurality of prefabricated floor modules and wherein a plurality of assembly elements are provided to connect each of said floor modules to an adjacent floor module during or after installation in the aircraft.

10. The aircraft according to claim 6, wherein said floor elements comprise sealing devices adapted to seal off a space defined above said floor elements from a space defined below said floor elements.

11. The aircraft according to claim 6, wherein leakproof connecting elements are provided and form a leakproof connection between each of said floor elements and at least one of adjacent floor elements and the skin of the aircraft.

12. The aircraft according to claim 6, wherein drainage devices are provided to carry a liquid out of the cargo compartment and to transfer said liquid into a corresponding drainage device of an adjacent floor module.

13. The aircraft according to claim 6, wherein said floor modules comprise insulating devices adapted to insulate a lower portion of a fuselage of the aircraft.

14. The aircraft according to claim 13, wherein said insulating devices are attached below said floor elements and/or in the region of the supporting beams near to said skin of the aircraft.

15. The aircraft according to claim 6, wherein said floor modules comprise at least one of a partition wall and a fixation device for a partition wall.

16. A method of installing functional units in an aircraft comprising a cargo compartment with a cargo-compartment floor, comprising the steps of:

providing at least one functional unit selected from the group consisting of a water tank and a waste-water tank, said functional unit comprising at least one pipe connector;

providing at least one pallet;

mounting said functional unit on said pallet outside the aircraft;

loading said functional unit mounted on said pallet into the aircraft;

transporting said functional unit mounted on said pallet over said cargo-compartment floor to a destination site in the cargo compartment;

fixing said functional unit mounted on said pallet to the cargo-compartment floor at the destination site; such that the pallet lays on the cargo-compartment floor between the cargo-compartment floor and the functional unit; and connecting said at least one pipe connector to a corresponding pipe connector provided on or below said cargo compartment floor.

17. The method according to claim 16, wherein at least sections of partition walls are mounted on at least one of the pallets and the functional unit while they are outside the aircraft prior to installation therein.

* * * * *